(12) United States Patent
Freudelsperger

(10) Patent No.: US 8,401,695 B2
(45) Date of Patent: Mar. 19, 2013

(54) PROCESS AND DEVICE FOR AUTOMATICALLY FEEDING CONTAINERS OF THE SAME KIND TO A COLUMN STACKER, PREFERABLY IN A SORTER SYSTEM

(75) Inventor: Karl Freudelsperger, Hart bei Graz (AT)

(73) Assignee: Knapp AG, Hart bei Graz (AT)

( * ) Notice: Subject to any disclaimer, the term of this patent is extended or adjusted under 35 U.S.C. 154(b) by 488 days.

(21) Appl. No.: 12/676,027

(22) PCT Filed: Sep. 11, 2008

(86) PCT No.: PCT/EP2008/007447
§ 371 (c)(1),
(2), (4) Date: Mar. 2, 2010

(87) PCT Pub. No.: WO2009/043432
PCT Pub. Date: Apr. 9, 2009

(65) Prior Publication Data
US 2010/0198393 A1    Aug. 5, 2010

(30) Foreign Application Priority Data
Sep. 30, 2007 (DE) ............ 10 2007 046 424

(51) Int. Cl.
*G06F 7/00* (2006.01)
*G05B 13/00* (2006.01)
*B65G 57/00* (2006.01)
*B65G 67/00* (2006.01)

(52) U.S. Cl. ...... 700/223; 700/27; 700/215; 700/230; 700/275; 700/216; 414/802; 414/286; 414/755.1; 414/266

(58) Field of Classification Search .................... None
See application file for complete search history.

(56) References Cited

U.S. PATENT DOCUMENTS
5,844,807 A * 12/1998 Anderson et al. ............ 700/217

FOREIGN PATENT DOCUMENTS
| DE | 36 30 718 | 3/1988 |
| DE | 199 06 604 | 9/1999 |
| EP | 0 385 455 | 9/1990 |
| EP | 385455 A1 * | 9/1990 |

* cited by examiner

*Primary Examiner* — Gene Crawford
*Assistant Examiner* — Yolanda Jones
(74) *Attorney, Agent, or Firm* — McGlew and Tuttle, P.C.

(57) ABSTRACT

A method and a device are provided for automatically supplying packages, that have been sorted by type, to a column stacker, preferably in a sorting system. The device has at least one supply path (2) on which the packages, which have been sorted by type, are automatically supplied to the column stacker (3) individually and chaotically distributed in partial stacks. The invention proposes that at least two packages (T1, T1) or partial stacks of packages (T2, T2 or T3, T3 or T4, T4 or T5, T5)—as long as said partial stacks are not already randomly present on the supply path (2)—of the same height disposed one directly behind the other be combined with the aid of a package register 1 before being supplied to the column stacker (3) simultaneously.

17 Claims, 13 Drawing Sheets

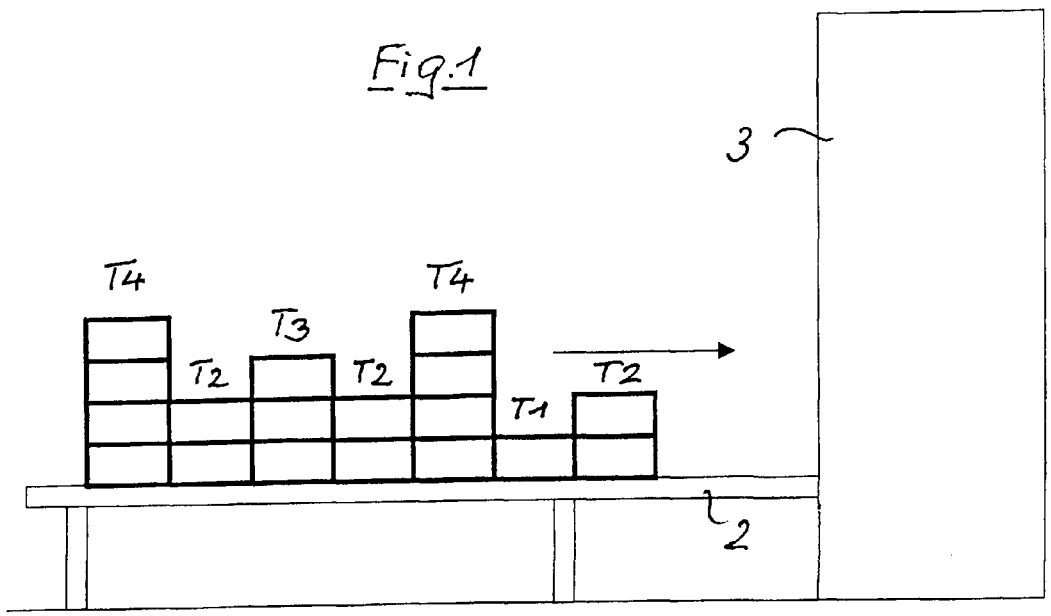
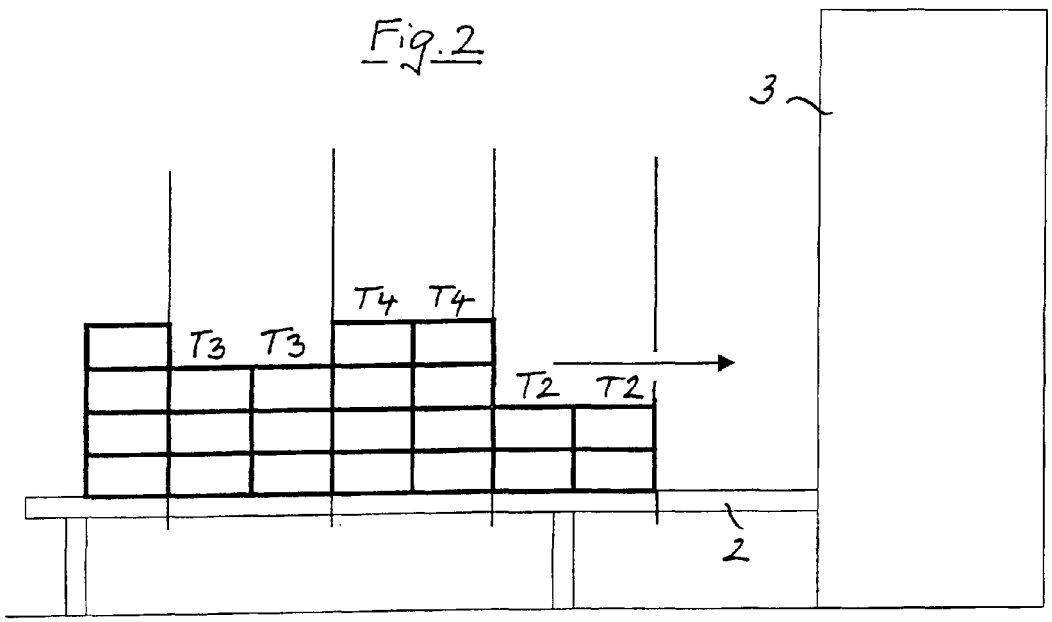

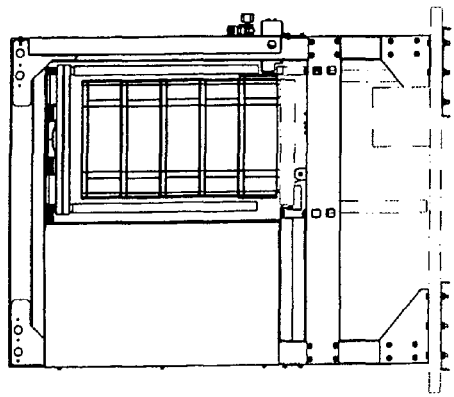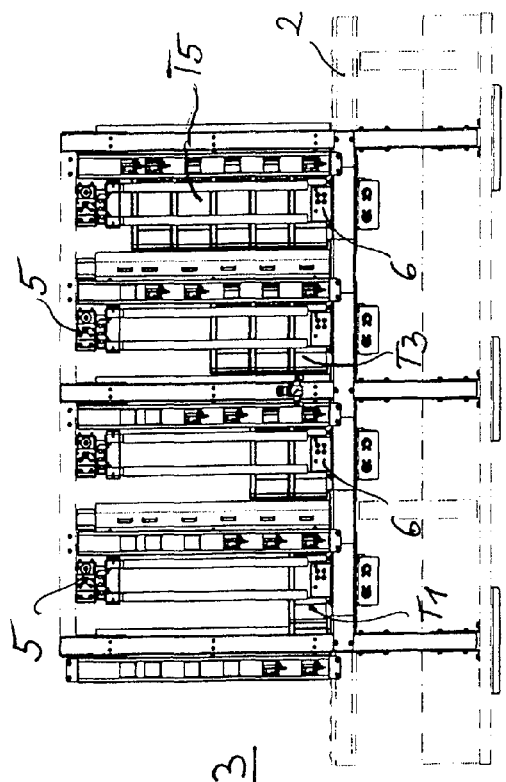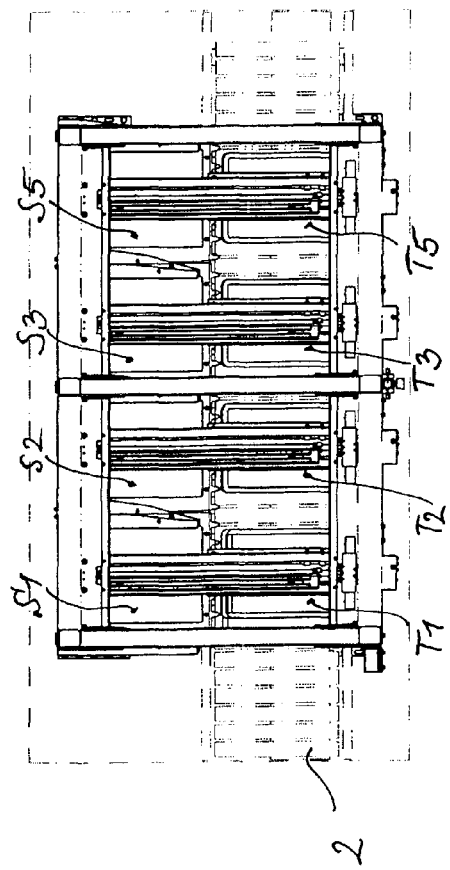

PROCESS AND DEVICE FOR AUTOMATICALLY FEEDING CONTAINERS OF THE SAME KIND TO A COLUMN STACKER, PREFERABLY IN A SORTER SYSTEM

CROSS REFERENCE TO RELATED APPLICATIONS

This application is a United States National Phase application of International Application PCT/EP 2008/007,447 and claims the benefit of priority under 35 U.S.C. §119 of filed, the entire contents of which are incorporated herein by reference.

FIELD OF THE INVENTION

The present invention pertains to a process and a device for automatically feeding containers of the same kind to a column stacker, preferably in a sorter system, with at least one feed section, on which the containers of the same kind are fed automatically to a column stacker one by one and chaotically (randomly) distributed in partial stacks.

BACKGROUND OF THE INVENTION

It is necessary in connection with the high-performance, fully automatic stacking of containers of various shapes and geometries, which can be automated, to construct stacking machines that are capable of stacking a great variety of kinds of containers. In terms of their systems, the stacking machines are so-called column stackers. The stacking of containers is part of an overall logistic solution for sorting containers that can be automated.

To increase performance and efficiency, containers are not moved through the plant as individual boxes but in stacks on feed sections. The maximum stack height is limited for every individual kind of container. The distribution of the containers on the feed sections is chaotic (random), i.e., the order and the stack height in which the individual kinds of containers arrive at the area of automatic stacking are not known or cannot be manipulated. A stacking machine is capable, in principle, of stacking a plurality of kinds of containers. A single kind of container is always associated with a column stacker during the running operation. Kinds of containers can be characterized by different areas, different container heights, and, e.g., different patterns and colors while the external geometry is the same.

The control of the entire plant guarantees that only the one kind of container is fed to the stacking machine. The stacking machine is a column stacker, which forms towers of a defined height depending on the kinds of containers.

The stacking machine grips for this purpose a stack of containers of a defined height and lifts it up. A subsequent stack of containers of, for example, another height moves into the machine. The machine places the lifted-up stack onto the introduced stack, repositions itself and grips both stacks and lifts up both. Another stack of, for example, yet another height is now moving in. The process is repeated until a tower of defined height has formed. It appears from the above description that only a single stack of containers can enter the stacking machine at any time, namely, when the stack is lifted up in the machine.

A prior-art stacking machine can stack large, but also small containers. It is disadvantageous that the performance capacity of the machine is not fully utilized when stacking smaller containers, because the machine is designed, by virtue of its dimension, for large containers with a large area.

SUMMARY OF THE INVENTION

Based on the above-described state of the art, the object of the present invention is to provide a process and a device of the type mentioned in the introduction for feeding containers of the same kind, in which process and device the maximum stacking capacity of the stacking machine or column stacker can be optimally utilized in case of smaller containers as well.

According to the invention a process is provided for automatically feeding containers of the same kind to a column stacker, preferably in a sorter system, with at least one feed section, on which the containers being of the same kind are fed automatically to a column stacker one by one and distributed chaotically in partial stacks. The process provides that at least two containers or partial container stacks, which are of equal height and are arranged directly one after another, are automatically composed (compiled)—unless they are accidentally already present (in a composed state) on the feed section—before simultaneous feeding (the composed—equal height arranged directly one after another) to the column stacker.

According to another aspect of the invention a device it provided for automatically feeding containers of the same kind to a column stacker, preferably in a sorter system. The device has at least one feed section, on which the containers of the same kind are fed automatically to the column stacker one by one and distributed chaotically in partial stacks. A container register is provided joining the feed section for the simultaneous automatic feeding of at least two containers or partial container stacks, which are of equal height and are arranged directly one after another, to the column stacker.

The essence of the present invention is that at least containers or partial stacks of containers, which are of equal height and are arranged directly one after the other—are composed automatically before being fed simultaneously to the column stacker, unless they are already accidentally present on the feed section.

As a result, the stacking capacity can be practically doubled, for example, in case of smaller containers, whose area is half that of a large container, for which the column stacker is designed. Consequently, smaller containers can be stacked twice as fast and twice as effectively according to the present invention as this is possible according to the state of the art. Since the two stacked-up stack towers are arranged directly one after the other, the two towers, which mutually stabilize each other, can also continue to be handled further in pairs following the column stacker and especially removed and fed to a storage space. This saves time and operation is reliable.

Containers are defined as stackable containers such as open and closed boxes, crates, cardboard boxes and the like, with or without contents, especially portable empty containers or empties, for example, in a supermarket. The presorted containers of the same kind, which are fed on the feed section, are characterized by stackable containers having equal area, but mostly by identical containers of equal height.

In particular, the containers or partial container stacks, which are usually of equal height and are arranged directly one after another, are composed automatically in the feed section at a container register adjoining the feed section, and a special control means is provided, which not only assumes the automatic compilation, but sets up, on the whole, a fully automatic stacking operation at a column stacker together with a central computer of the plant.

An empty container register is preferably filled by automatically feeding an individual container as well as a partial container stack each of different stack heights to the empty container register on the feed section and intermediately storing them in the container register.

A frontmost container fed in the direction of the column stacker on the feed section or frontmost fed partial container stack is preferably recognized automatically and mated to the corresponding container or partial container stack at the container register, and the two containers or partial container stacks arranged directly one after another are then fed simultaneously to the column stacker.

The containers and partial container stacks following the recognized container or partial container stack are stopped on the feed section if necessary. In particular, the recognized container or partial container stack, whose height has been recognized, is positioned for the mating on the feed section at the container register directly in front of or behind the corresponding, laterally arranged container/partial stack being stored intermediately in the container register, and the corresponding container or corresponding partial container stack being stored intermediately is transported automatically at right angles into the feed section to the positioned container/partial stack.

An empty space of a removed and intermediately stored container/partial stack is preferably automatically occupied again by feeding a corresponding container or corresponding partial container stack from the feed section, as well as a corresponding frontmost container or corresponding frontmost partial container stack is recognized on the feed section.

Even though the containers are fed on the feed section such that they are all of the same kind, provisions may be made as a precaution for an unrecognized container that is not of the same kind or an unrecognized partial container stack that is not of the same kind to be laterally removed from the feed section or to be fed to a secondary section.

In an advantageous expansion of the plant, provisions may be made for another kind of container that is of the same kind to be fed in the manner of the aforementioned first container kind on a preferably parallel additional feed section at least in pairs to an additional column stacker of the same configuration.

Furthermore, provisions may be made for a kind of container that is of the same kind corresponding to the maximum stacking capacity of the column stacker to be fed on a preferably parallel third feed section to a third column stacker of the same configuration without the insertion of a container register.

The present invention will be described in more detail below on the basis of exemplary embodiments with reference to the drawings attached. The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which preferred embodiments of the invention are illustrated.

BRIEF DESCRIPTION OF THE DRAWINGS

In the drawings:

FIG. 1 is a schematic side view of a device for feeding containers of the same kind according to the state of the art;

FIG. 2 is a corresponding device according to the present invention in a view corresponding to FIG. 1 in a general comparison;

FIG. 3 is a schematic side view of a container register according to the present invention with feed section in a process step I immediately before the filling of an empty container register with a container or with partial container stacks;

FIG. 4 is a schematic front view of the container register according to the present invention with feed section in a process step I immediately before the filling of an empty container register with a container or with partial container stacks;

FIG. 5 is a schematic top view of the container register according to the present invention with feed section in a process step I immediately before the filling of an empty container register with a container or with partial container stacks;

DESCRIPTION OF THE PREFERRED EMBODIMENTS

Figure 6:
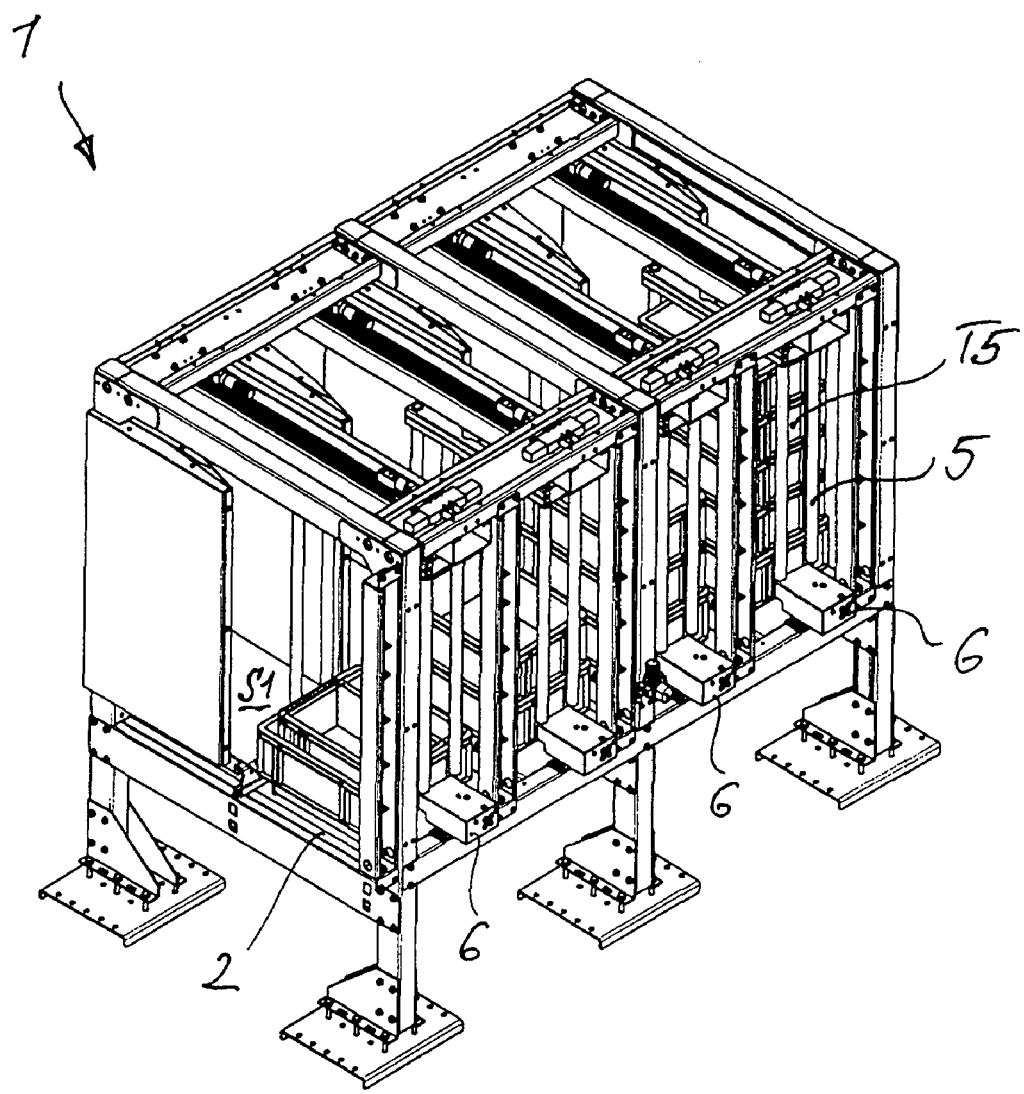
FIG. 6 is a schematic perspective view of a container register according to the present invention with feed section in a process step I immediately before the filling of an empty container register with a container or with partial container stacks.
Figure 8:
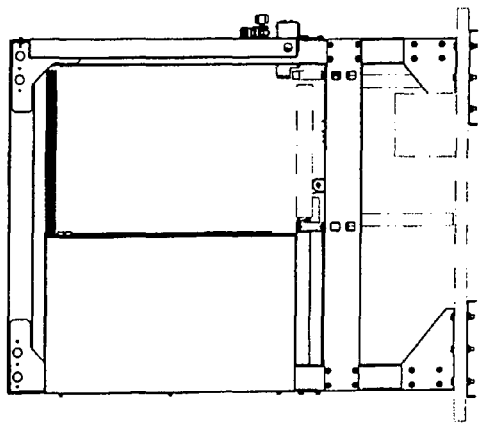
FIG. 8 is a schematic view, corresponding to FIG. 4, of the container register in a process step II immediately after filling an empty container register with a container or with partial container stacks.
Figure 7:
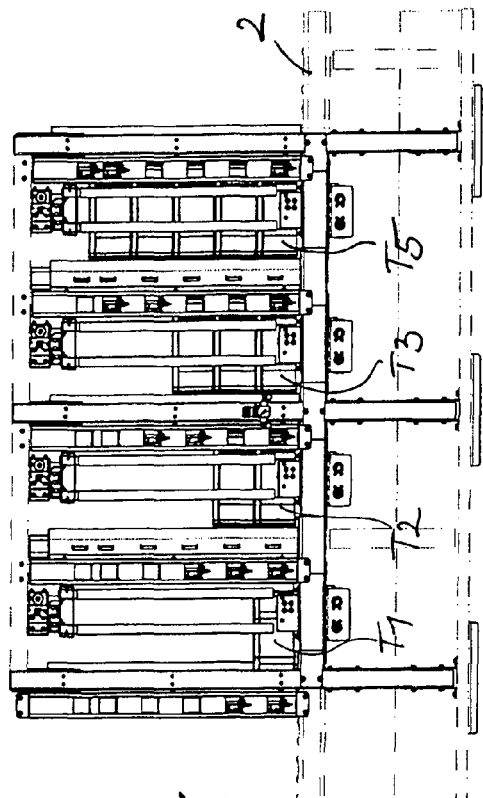
FIG. 7 is a schematic view, corresponding to FIG. 3, of the container register in a process step II immediately after filling an empty container register with a container or with partial container stacks.

Referring to the drawings in particular, FIG. 1 schematically shows a prior-art device for automatically feeding containers of the same kind, preferably in a sorter system.

The prior-art feeding device comprises at least a feed section 2, on which the containers T1, which are all of the same kind, are fed automatically to a column stacker one by one and distributed chaotically in partial stacks T2, T3 and T4 and are stacked up in the column stacker preferably automatically, and the full stack is subsequently removed.

To increase the performance and efficiency, the containers are preferably moved through the plant not as individual boxes but in stacks on the feed section 2. The maximum stack height is limited for every individual kind of container. A single kind of container is always associated with a column stacker 3. The control of the entire plant guarantees that only the one kind of container is fed to the column stacker 3. To form and stack a container tower of a defined overall height, the column stacker 3 grips the right-hand partial container stack T2 comprising two individual containers corresponding to FIG. 1 after they have moved into the column stacker and lifts it up. A next "container stack" comprising a single container T1 moves into the machine. The machine places the lifted-up partial container stack T2 onto container T1, repositions itself and grips both stacks T2 as well as T1 and lifts up both. The next partial container stack T4 comprising four individual containers now moves in. The operation is repeated until a tower of a defined height has formed. It appears from the above description that only a single container stack can move into the column stacker at any time, namely, when the stack having moved into the column stacker 3 is lifted up.

The prior-art column stacker is designed for large containers with a maximum area, but it is also capable of stacking up smaller containers with a smaller area, e.g., half the area. Based on the fact that the prior-art column stacker is designed for both geometries, stacking capacity is lost within the column stacker for containers having, e.g., half the area.

The essence of the present invention is that at least two partial container stacks T2, T2 according to the right-hand part of FIG. 2, which are of equal height and are arranged directly one after another, are fed simultaneously to the column stacker 3, then T4, T4, and then T3, T3, etc., are fed, which are then stacked up simultaneously by the column stacker. The stacking capacity of the column stacker can be increased to at least double as a result in case of smaller containers if the area of the smaller containers is half the maximum area of a large container, for which the column stacker is designed, i.e., the sum of the two areas of the smaller containers is equal to the maximum area of a large container.

To feed at least two containers T1, T1 or partial container stacks T2, T2 or T3, T3 or T4, T4 or T5, T5, which have equal height and are arranged directly one after another, to the column stacker 3 according to FIG. 2 simultaneously, a container register 1 according to FIGS. 3 through 26 is provided in the area of feed section 2.

Figure 9:
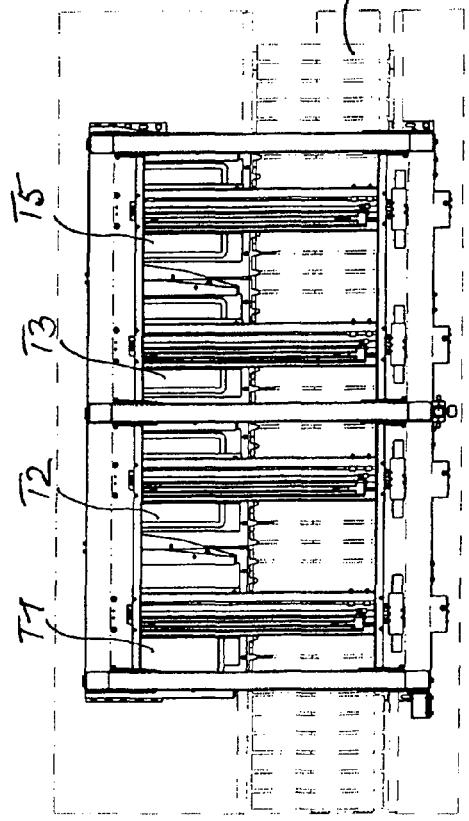
FIG. 9 is a schematic view, corresponding to FIG. 5, of the container register in a process step II immediately after filling an empty container register with a container or with partial container stacks.
Figure 10:
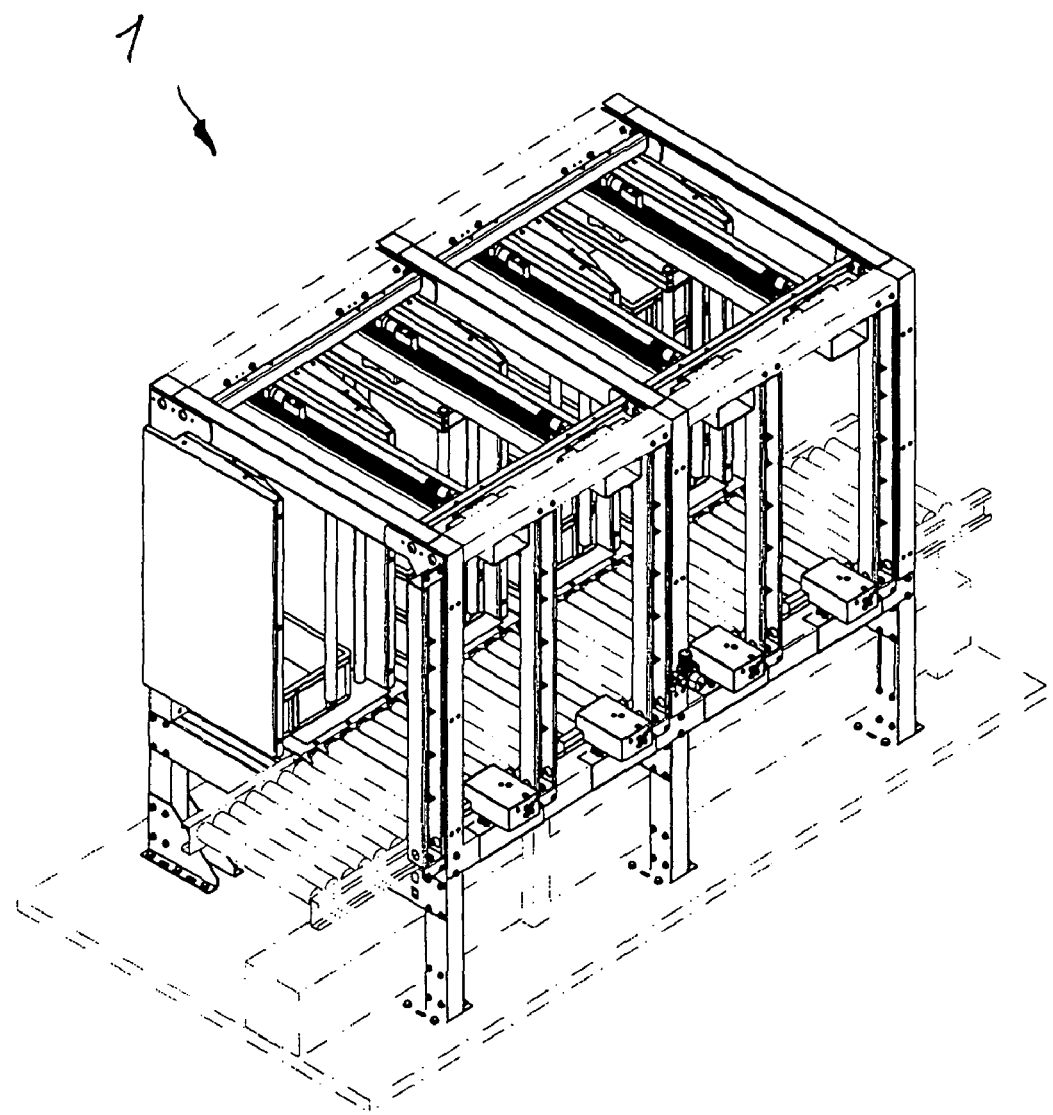
FIG. 10 is a schematic view, corresponding to FIG. 6, of the container register in a process step II immediately after filling an empty container register with a container or with partial container stacks.
Figure 12:
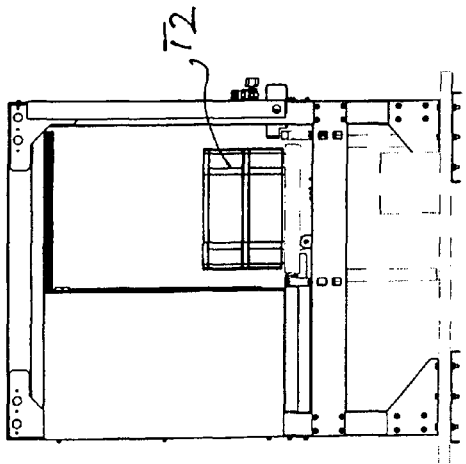
FIG. 12 is a schematic view corresponding to FIG. 4, of the container register in a process step immediately after recognizing and feeding a partial container stack T2 to the container register.
Figure 11:
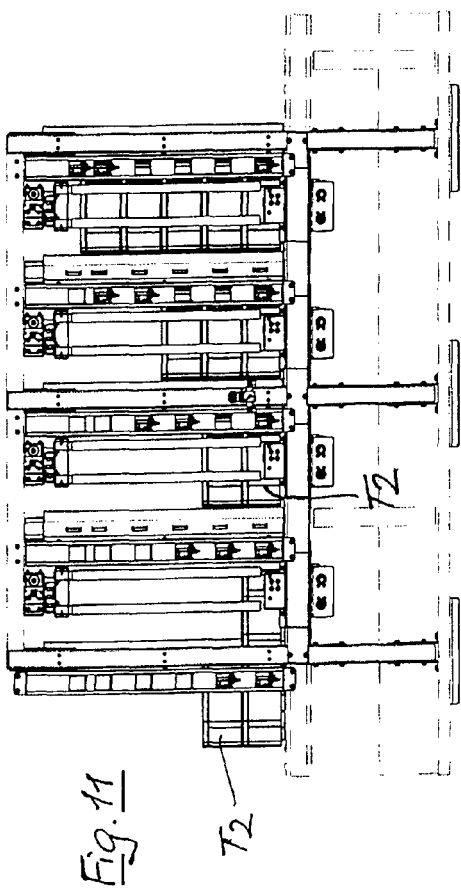
FIG. 11 is a schematic view corresponding to FIG. 3, of the container register in a process step immediately after recognizing and feeding a partial container stack T2 to the container register.
Figure 13:
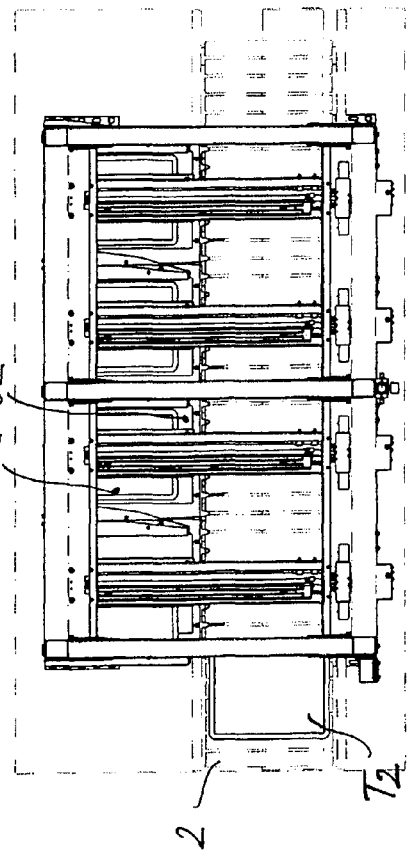
FIG. 13 is a schematic view corresponding to FIG. 5, of the container register in a process step immediately after recognizing and feeding a partial container stack T2 to the container register.
Figure 14:
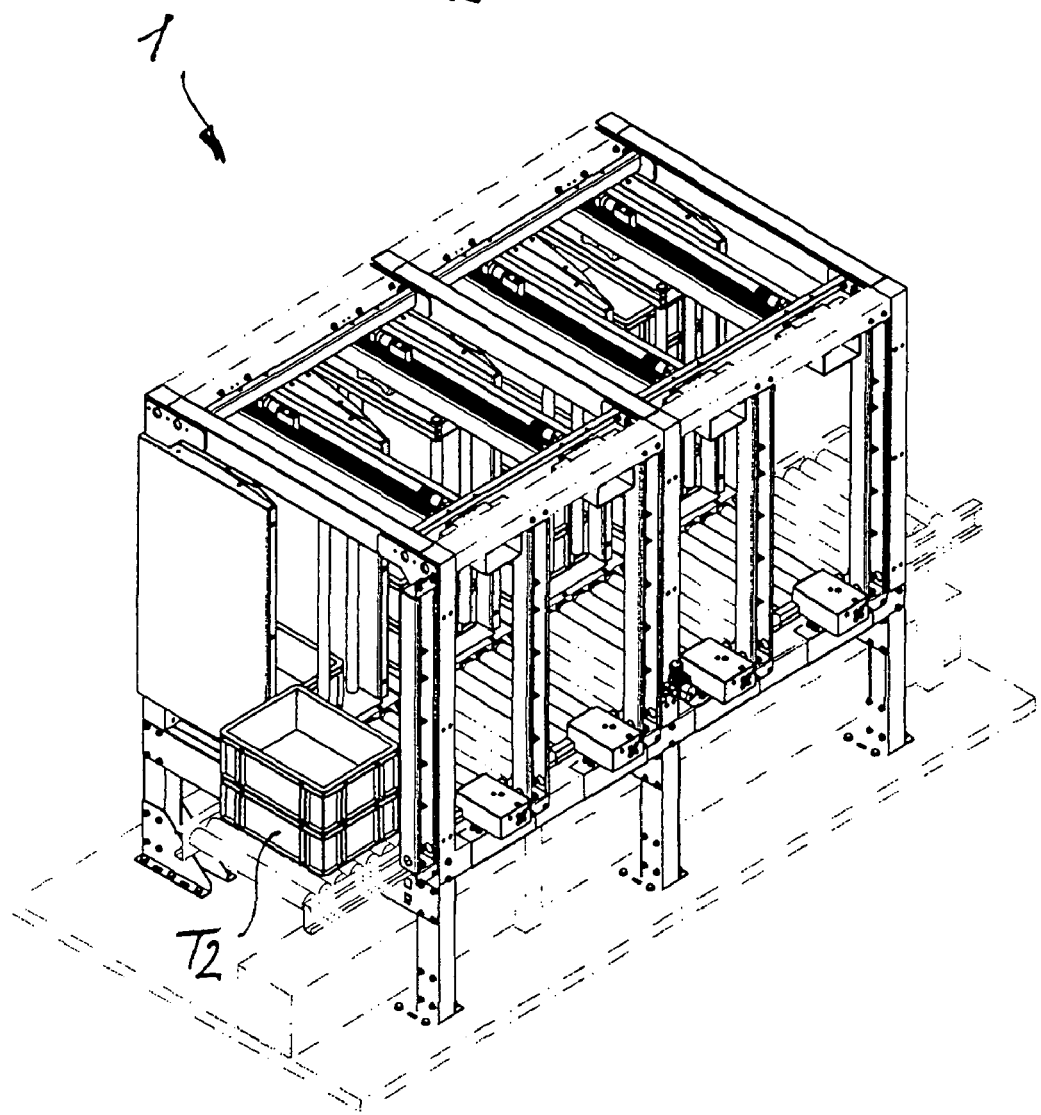
FIG. 14 is a schematic view corresponding to FIG. 6, of the container register in a process step immediately after recognizing and feeding a partial container stack T2 to the container register.
Figure 16:
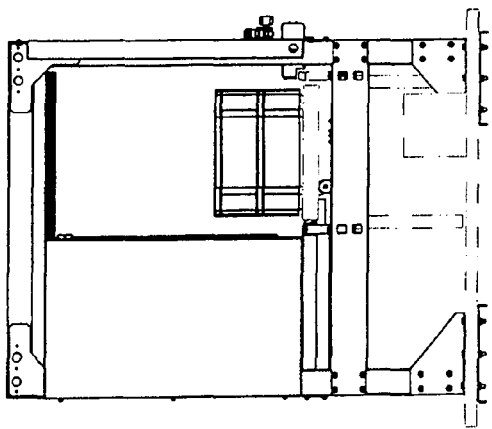
FIG. 16 is a schematic view corresponding to FIG. 4, of the container register in a process step IV immediately after positioning the aforementioned partial container stack T2 directly in front of the corresponding partial container stack T2 on storage space S2 in the container register.
Figure 15:
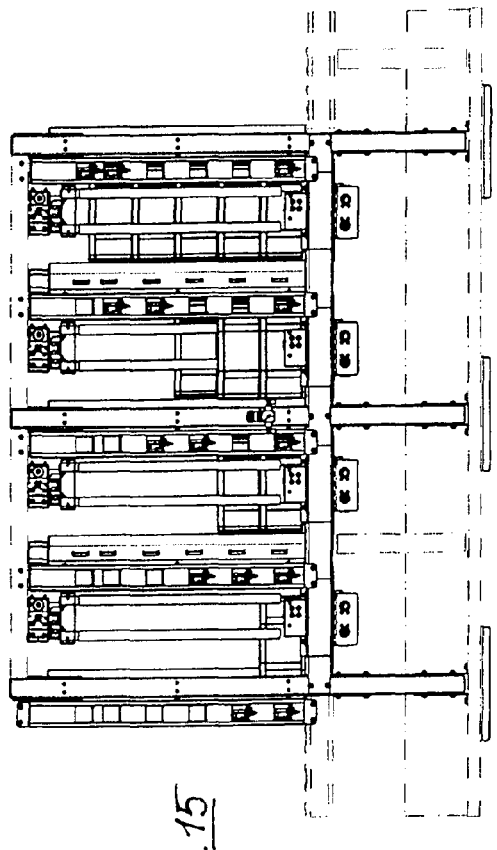
FIG. 15 is a schematic view corresponding to FIG. 3, of the container register in a process step IV immediately after positioning the aforementioned partial container stack T2 directly in front of the corresponding partial container stack T2 on storage space S2 in the container register.
Figure 17:
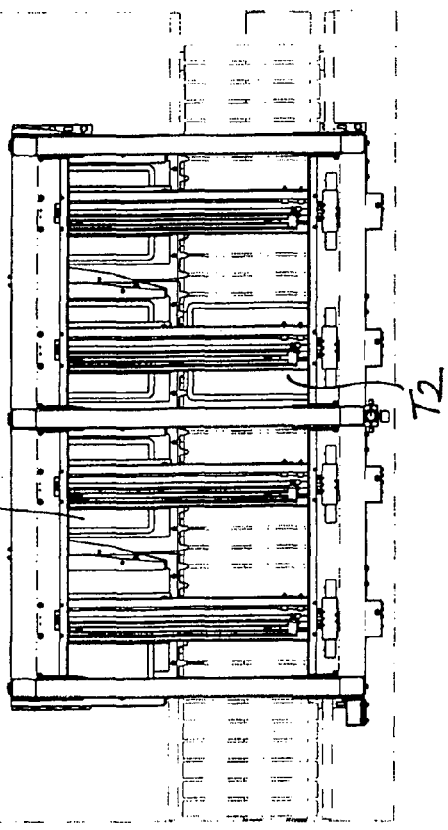
FIG. 17 is a schematic view corresponding to FIG. 5, of the container register in a process step IV immediately after positioning the aforementioned partial container stack T2 directly in front of the corresponding partial container stack T2 on storage space S2 in the container register.
Figure 18:
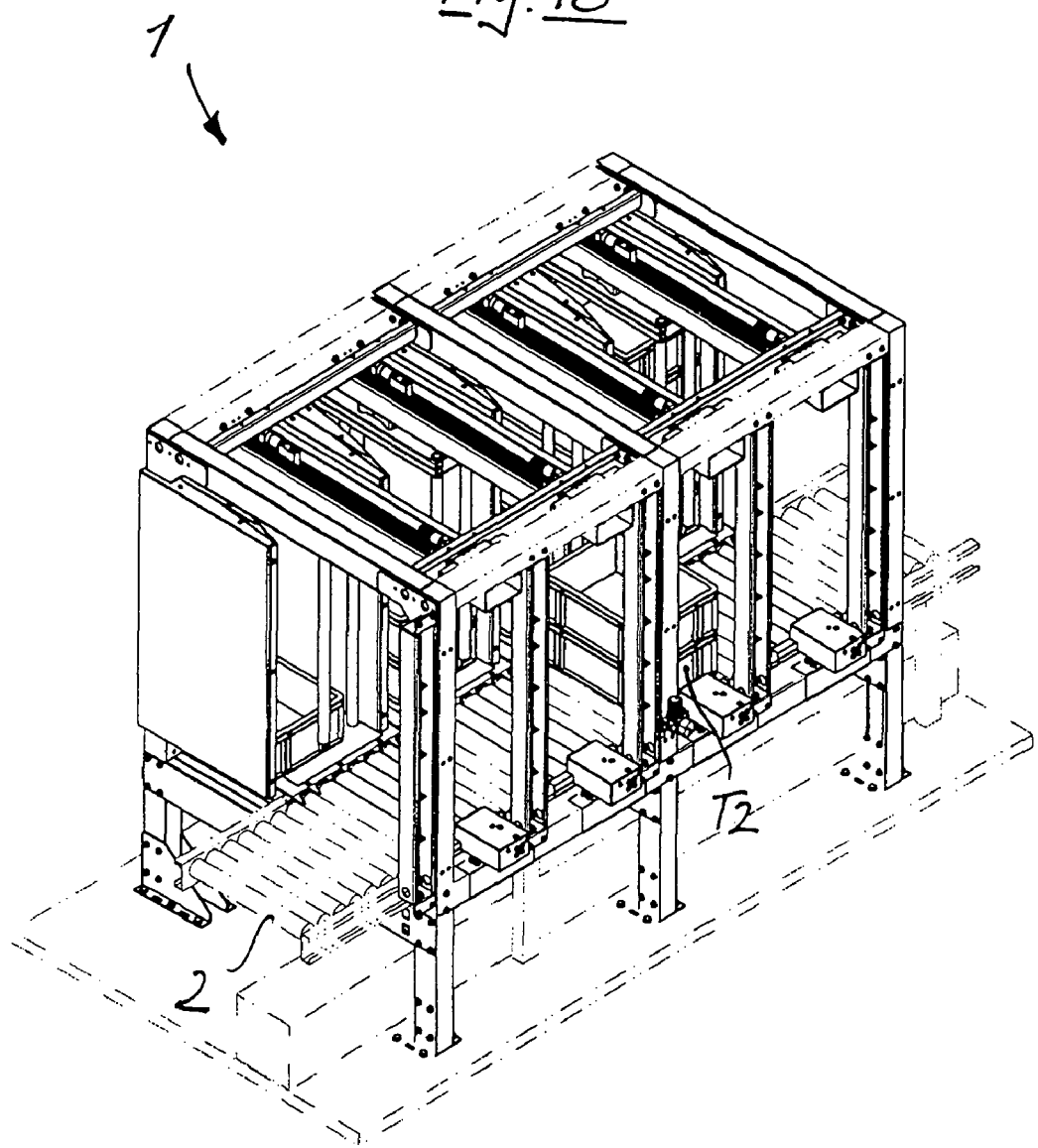
FIG. 18 is a schematic view corresponding to FIG. 6, of the container register in a process step IV immediately after positioning the aforementioned partial container stack T2 directly in front of the corresponding partial container stack T2 on storage space S2 in the container register.
Figure 20:
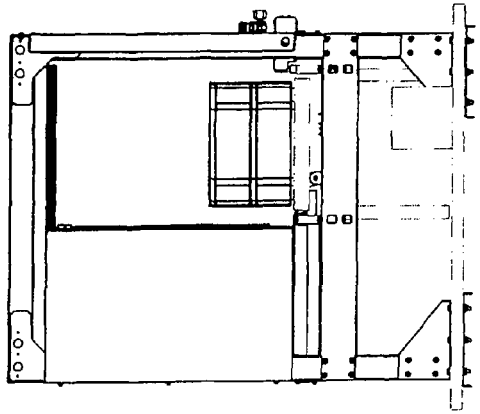
FIG. 20 is a schematic view, corresponding to FIG. 4, of the container register in a process step V immediately after a transverse displacement of the partial container stack T2 of the container register on the feed section directly behind the positioned partial container stack T2 on the feed section for mating.
Figure 19:
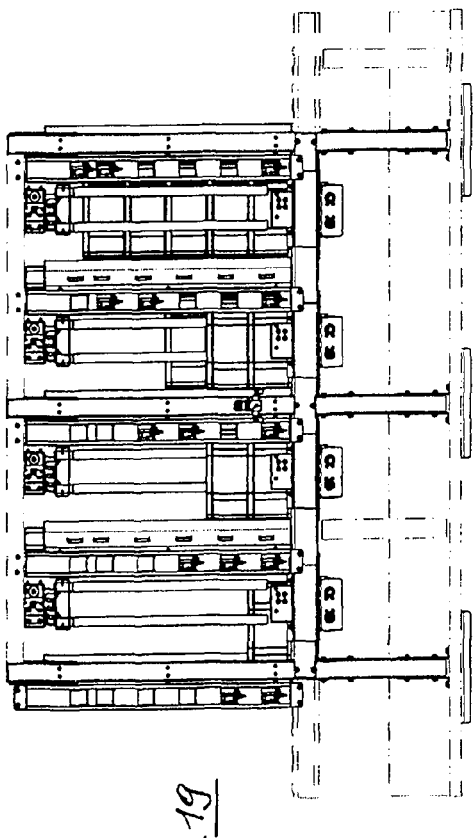
FIG. 19 is a schematic view, corresponding to FIG. 3, of the container register in a process step V immediately after a transverse displacement of the partial container stack T2 of the container register on the feed section directly behind the positioned partial container stack T2 on the feed section for mating.
Figure 21:
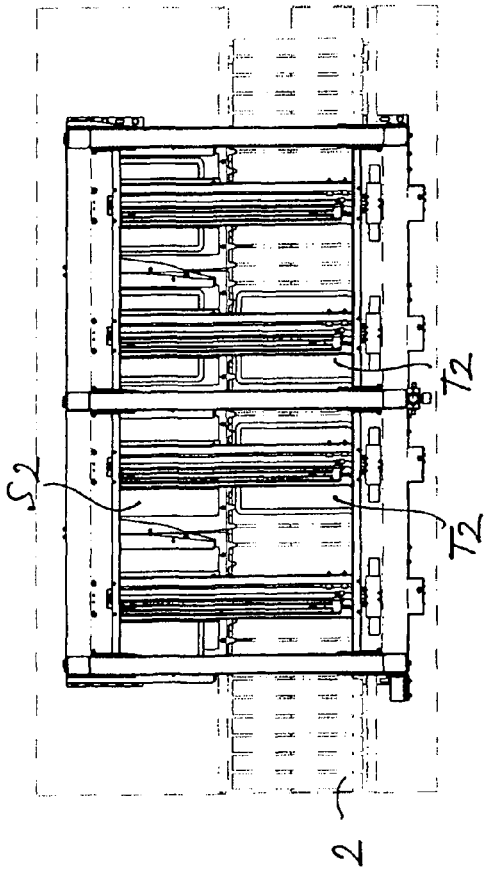
FIG. 21 is a schematic view, corresponding to FIG. 5, of the container register in a process step V immediately after a transverse displacement of the partial container stack T2 of the container register on the feed section directly behind the positioned partial container stack T2 on the feed section for mating.
Figure 22:
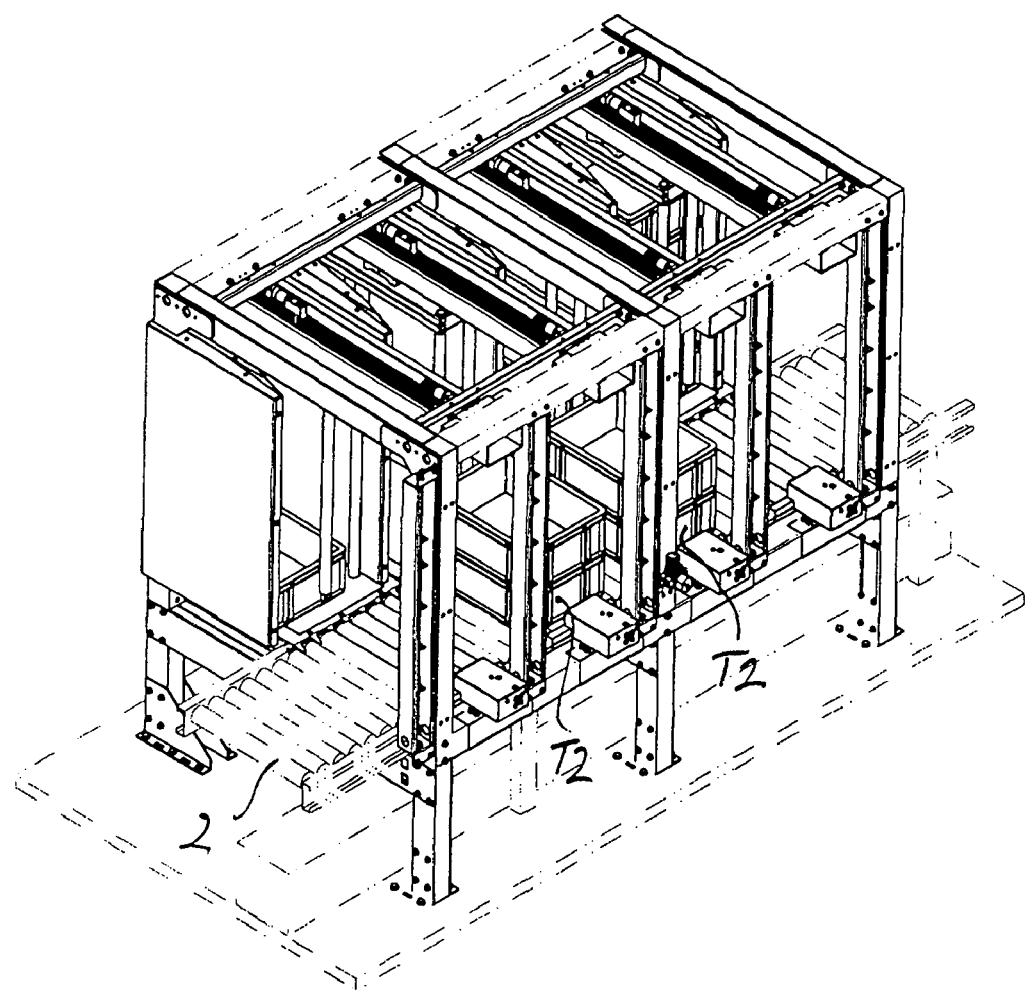
FIG. 22 is a schematic view, corresponding to FIG. 6, of the container register in a process step V immediately after a transverse displacement of the partial container stack T2 of the container register on the feed section directly behind the positioned partial container stack T2 on the feed section for mating.
Figure 24:
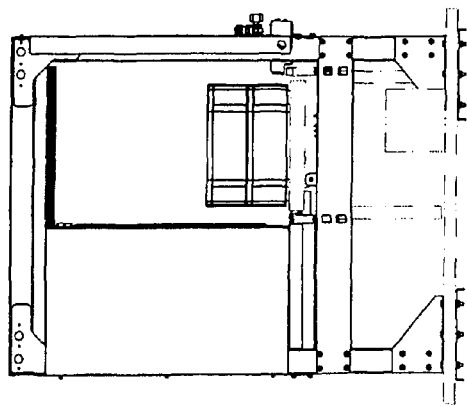
FIG. 24 is a schematic view, corresponding to FIG. 4, of the container register in a process step VI after mating two partial container stacks T2, T2 with removal on the feed section to a column stacker.
Figure 23:
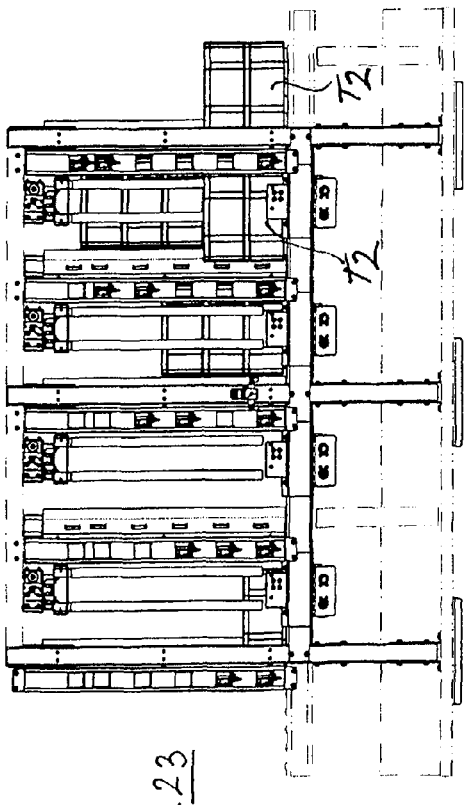
FIG. 23 is a schematic view, corresponding to FIG. 3, of the container register in a process step VI after mating two partial container stacks T2, T2 with removal on the feed section to a column stacker.
Figure 25:
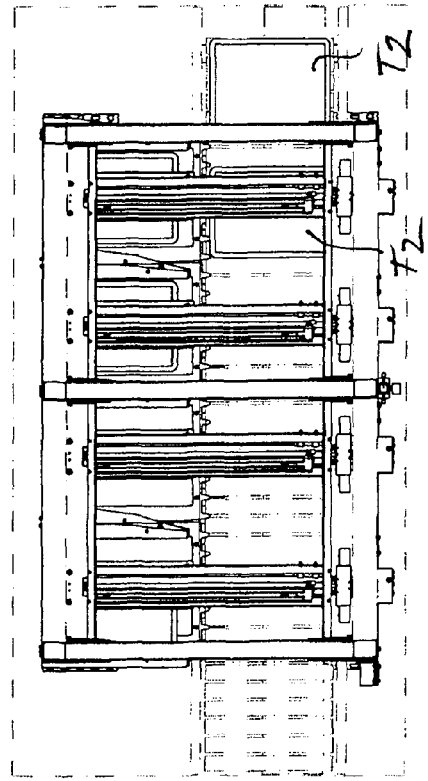
FIG. 25 is a schematic view, corresponding to FIG. 5, of the container register in a process step VI after mating two partial container stacks T2, T2 with removal on the feed section to a column stacker.
Figure 26:
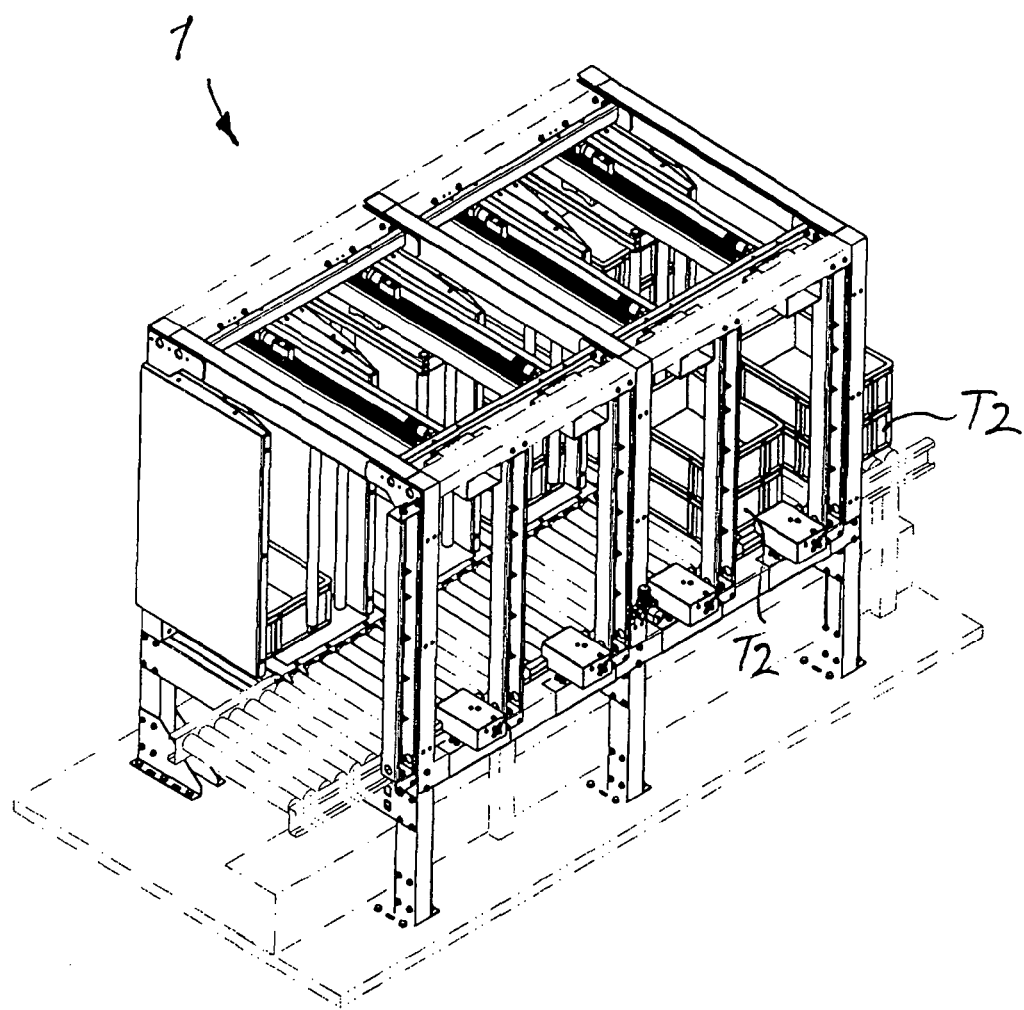
FIG. 26 is a schematic view, corresponding to FIG. 6, of the container register in a process step VI after mating two partial container stacks T2, T2 with removal on the feed section to a column stacker.

The container register 1 according to FIGS. 3 through 26 stocks during the operation every individual possible height of containers T1 or every individual possible height of partial container stacks T2, T3, T4, T5 a single time, doing so on storage spaces S1, S2, 3, S4 and S5, as this can be seen, for example, in FIG. 5 in conjunction with FIG. 9. If a container fed on feed section 2 or a fed partial container stack T2 is recognized, for example, according to the left-hand part of FIG. 13, a control means polls the container register 1 about where the corresponding container or the corresponding partial container stack T2 is stored intermediately in the container register, in the exemplary embodiment in storage space S2, for example, according to the top part of FIG. 13. The container recognized on feed section 2 or the partial container stack T2 recognized on the feed section now moves to the place of the corresponding container or partial stack being stored intermediately, for example, according to FIG. 17 the lower partial container stack T2 directly in front of the partial container stack T2 being stored, top, to merge with this according to FIG. 21 on feed section 2. After merging, the two together will then reach the column stacker 3, for example, according to the right-hand part of FIG. 25. The empty space of the storage space S2, which has become empty in the container register 1, is again occupied, as well as an identical container or an identical partial container stack is again recognized at feed section 2.

Before the control means searches for an associated container or an associated partial container stack in the container register 1 after recognizing a container or a partial container stack, the container/partial stack arranged after it on the feed section 2 is first recognized and polled to determine whether the two containers/partial stacks are identical. If the two are identical, both containers/partial stacks are fed directly to the stacker bypassing the container register or passing through the container register.

Consequently, the above-mentioned, prior-art stacking device is varied according to FIGS. 3 through 26 such that the feed section 2 is joined by a container register 1, which makes it possible to automatically feed simultaneously at least two containers T1, T1 or partial container stacks T2, T2 or T3, T3 or T4, T4 or T5, T5, which are of equal height and are directly adjacent to each other, to the column stacker 3.

The container register 1 has storage spaces S1, S2, S3, S4, S5, which extend in parallel to the feed section 2 and are directly adjacent to the feed section 2 and are located at the same level.

There are as many storage spaces as are different container heights and partial container stacks, which are fed on the feed section 2—five in the exemplary embodiment—and all containers have not only equal area but also equal height, and are especially of an identical design.

An individual container T1 as well as partial container stacks T2, T3, T4 and T5 of different heights can be stored intermediately on storage spaces S1, S2, S3, S4 and S5—storage space S4 is omitted in the drawings—and each storage space has a fully automatic cross pusher 5 to transport an individual container T1 or partial container stack T2, T3, T4, T5 from the associated storage space to the feed section 2 or vice versa. If the container register is not located directly next to the feed section for local reasons related to construction in a particular case, the storage spaces S1 through S5 are connected to the feed section 2 via driven cross-conveying sections.

Consequently, a device for automatically feeding containers T1 of the same kind to a column stacker 3 in a sorter system is provided according to FIGS. 2 through 26, with at least one feed section 2, on which the containers of the same kind are fed automatically to the column stacker 3 one by one and distributed chaotically in partial stacks.

Feed section 2 is joined by a container register 1 for the simultaneous automatic feeding of at least two containers T1, T1 or partial container stacks T2, T2 or T3, T3 or T4, T4 or T5, T5, which are of equal height and are arranged directly one after another, to the column stacker 3.

The container register 1 has storage spaces S1, S2, S3, S4, S5, which extend in parallel to the feed section 2 and on which an individual container T1 and partial container stack T2, T2 or T3, T3 or T4, T4 or T5, T5 of different heights can be stored intermediately, wherein each storage space has a cross-conveying section to the feed section or a cross pusher 5 if the storage spaces of the feed section are directly adjacent to each other.

The storage spaces S1, S2, S3, S4 and S5 of the container register 1 can be filled by automatically feeding a container T1 each or partial container stacks T2, T3, T5 or T5 of different heights from the feed section 2.

The device has a control means with sensors 6 at the feed section 2 and in the container register 1, which is set up such that a frontmost container T1 fed on the feed section 2 in the direction of the column stacker 3 or a fed frontmost partial container stack T2, T3, T4 or T5 is recognized and mated with the corresponding container or partial container stack of the container register at the container register, and the two containers T1, T1 or partial container stacks T2, T2 or T3, T3 or T4, T4 or T5, T5 arranged directly one after another are then fed simultaneously to the column stacker 3 on feed section 2.

The control means is set up, furthermore, such that containers or partial container stacks following the recognized container or partial container stack can be stopped on the feed section 2.

In particular, the control means is such that for mating, the recognized container T1 or recognized partial container stack T2, T3, T4 or T5 is positioned on the feed section 2 at the container register 1 directly in front of or behind the corresponding, laterally arranged container/partial stack being stored intermediately in the container register 1, and the container being stored intermediately or the partial container stack being stored intermediately is transported at right angles into the feed section 2 to the positioned container/partial stack.

The control means is also set up such that a container register empty space of a removed, intermediately stored container/partial stack T1, T2, T3, T4 or T5 is again filled by feeding a corresponding container or a corresponding partial container stack from the feed section, as well as a corresponding frontmost container T1 or a corresponding frontmost partial container stack T2, T3, T4 or T5 on the feed section 2 is recognized.

Finally, the control means may be set up such that an unrecognized container, which is not of the same kind, or an unrecognized partial container stack, which is not of the same kind, is laterally removed from the feed section 2 or is fed to a secondary section.

In an expansion, a parallel additional feed section with an additional container register may be provided for feeding another container kind in the manner of the aforementioned first container kind at least in pairs to an additional column stacker of the same configuration, and a parallel third feed section without insertion of a container register may be optionally provided for feeding a container of the same kind corresponding to the maximum stacking capacity of the column stacker to a third column stacker of the same configuration.

A container register 1 with a single row of storage spaces S1, S2, S3, S4, S5 is shown in the exemplary embodiment in the drawings in the conveying direction of the feed section 2, left, in the immediate lateral vicinity of the feed section. The container register 1 may also have a second row of storage spaces S1, S2, S3, S4, S5 on the other side of the feed section 2, the first and second rows being located at the storage spaces exactly opposite each other. Both rows of storage spaces are processed by the same cross pushers 5 of the device.

Furthermore, provisions may be made for a feed section 2 with containers/partial stacks being fed in a chaotically distributed pattern to be divided into two parallel feed lines after the recognition system and for a separate container register to be associated with each feed line. However, the two feed lines may also merge after the container registers and process a single column stacker.

While specific embodiments of the invention have been described in detail to illustrate the application of the principles of the invention, it will be understood that the invention may be embodied otherwise without departing from such principles.

The invention claimed is:

1. A process for automatically feeding containers of the same kind to a column stacker in a sorter system, the process comprising the steps of:
   providing at least one feed section;
   feeding containers of the same kind automatically with the feed section to the column stacker with the containers distributed either one by one or in partial stacks; and automatically composing at least two containers or partial container stacks, which are of equal height and are arranged directly one after another, unless the at least two containers or partial container stacks are accidentally already present on the feed section before simultaneous feeding to the column stacker, the at least two containers or partial container stacks, which are of equal height and are arranged directly one after another, being automatically composed in the feed section at a container register joining the feed section, wherein an empty container register is filled by automatically feeding to the empty container register on the feed section an individual container as well as a partial container stack and intermediately storing the fed individual containers as well as a partial container stack in the container register.

2. A process in accordance with claim 1, wherein a container register empty space of a removed, intermediately stored container/partial stack is automatically filled again by feeding a corresponding container or a corresponding partial container stack from the feed section, as well as a corresponding frontmost container or a corresponding frontmost partial container stack is recognized on the feed section.

3. A process for automatically feeding containers of the same kind to a column stacker in a sorter system, the process comprising the steps of:
providing at least one feed section;
feeding containers of the same kind automatically with the feed section to the column stacker with the containers distributed either one by one or in partial stacks; and
automatically composing at least two containers or partial container stacks, which are of equal height and are arranged directly one after another, unless the at least two containers or partial container stacks are accidentally already present on the feed section before simultaneous feeding to the column stacker, the at least two containers or partial container stacks, which are of equal height and are arranged directly one after another, being automatically composed in the feed section at a container register joining the feed section, wherein a frontmost partial container stack fed on the feed section in the direction of the column stacker is automatically recognized and is mated to the corresponding container or partial container stack of the container register, and the two containers or partial container stacks arranged directly one after the other are then fed simultaneously to the column stacker.

4. A process in accordance with claim 3, wherein the containers and partial container stacks following the recognized container or partial container stack are stopped during the mating on the feed section.

5. A process in accordance with claim 3, wherein for mating, the recognized container or recognized partial container stack on the feed section is positioned at the container register directly in front of or behind the corresponding, laterally arranged container/partial stack, which is being stored intermediately, and the corresponding container being stored intermediately or the corresponding partial container stack being stored intermediately is automatically transported at right angles into the feed section to the positioned container/partial stack.

6. A process in accordance with claim 3, wherein an unrecognized container, which is not of the same kind, or an unrecognized partial container stack, which is not of the same kind, is laterally removed from the feed section or is fed to a secondary section.

7. A process for automatically feeding containers of the same kind to a column stacker in a sorter system, the process comprising the steps of:
providing at least one feed section;
feeding containers of the same kind automatically with the feed section to the column stacker with the containers distributed either one by one or in partial stacks; and
automatically composing at least two containers or partial container stacks, which are of equal height and are arranged directly one after another, unless the at least two containers or partial container stacks are accidentally already present on the feed section before simultaneous feeding to the column stacker, wherein another container of the same kind in the manner of the aforementioned first container kind is automatically composed at least in pairs on a parallel additional feed section and is fed on the feed section at least in pairs to an additional column stacker of the same configuration.

8. A process in for automatically feeding containers of the same kind to a column stacker in a sorter system, the process comprising the steps of:
providing at least one feed section;
feeding containers of the same kind automatically with the feed section to the column stacker with the containers distributed either one by one or in partial stacks; and
automatically composing at least two containers or partial container stacks, which are of equal height and are arranged directly one after another, unless the at least two containers or partial container stacks are accidentally already present on the feed section before simultaneous feeding to the column stacker, wherein a container of the same kind corresponding the maximum stacking capacity of the column stacker is fed on a preferably parallel third feed section to a third column stacker of the same configuration without insertion of a container register.

9. A device for automatically feeding containers of the same kind to a column stacker in a sorter system, the device comprising:
at least one feed section, on which the containers of the same kind are fed automatically to the column stacker distributed either one by one or in partial stacks;
a container register joining the feed section for the simultaneous automatic feeding of at least two containers or partial container stacks, which are of equal height and are arranged directly one after another, to the column stacker, said container register having storage spaces extending in parallel to the feed section, on which said storage spaces an individual container or partial container stack can be stored intermediately, wherein each storage space has a cross-conveying section to the feed section or cross pusher if the storage spaces of the feed section are directly adjacent.

10. A device for automatically feeding containers of the same kind to a column stacker in a sorter system, the device comprising:
at least one feed section, on which the containers of the same kind are fed automatically to the column stacker distributed either one by one or in partial stacks; and
a container register joining the feed section for the simultaneous automatic feeding of at least two containers or partial container stacks, which are of equal height and are arranged directly one after another, to the column stacker, wherein the storage spaces of the container register can be filled by automatically feeding a container each or partial container stacks from the feed section.

11. A device for automatically feeding containers of the same kind to a column stacker in a sorter system, the device comprising:
- at least one feed section, on which the containers of the same kind are fed automatically to the column stacker distributed either one by one or in partial stacks;
- a container register joining the feed section for the simultaneous automatic feeding of at least two containers or partial container stacks, which are of equal height and are arranged directly one after another, to the column stacker; and
- a control means with sensor at the feed section and in the container register, which is set up such that a frontmost container fed or a frontmost partial container stack fed on the feed section in the direction of the column stacker is recognized and mated at the container register to the corresponding container or partial container stack of the container register, and the two containers or partial container stacks, which are now arranged directly one after another, are fed simultaneously on the feed section to the column stacker.

12. A device in accordance with claim 11, wherein the control means is set up such that containers or partial container stacks following the recognized container or partial container stack on the feed section are stopped.

13. A device in accordance with claim 11, wherein the control means is set up such that for mating, the recognized container or recognized partial container stack is positioned on the feed section at the container register directly in front of or behind the corresponding, laterally arranged container/partial stack being stored intermediately in the container register, and the container being stored intermediately or the partial container stack being stored intermediately is transported at right angles into the feed section to the positioned container/partial stack.

14. A device in accordance with claim 11, wherein the control means is set up such that a container register empty space of a removed container/partial stack stored intermediately is filled again by feeding a corresponding container or a corresponding partial container stack from the feed section, as well as a corresponding frontmost container or a corresponding frontmost partial container stack is recognized on the feed section.

15. A device in accordance with claim 11, wherein the control means is set up such that an unrecognized container, which is not of the same kind, or an unrecognized partial container stack, which is not of the same kind, is laterally removed from the feed section or is fed to a secondary section.

16. A device for automatically feeding containers of the same kind to a column stacker in a sorter system, the device comprising:
- at least one feed section, on which the containers of the same kind are fed automatically to the column stacker distributed either one by one or in partial stacks;
- a container register joining the feed section for the simultaneous automatic feeding of at least two containers or partial container stacks, which are of equal height and are arranged directly one after another, to the column stacker; and
- a parallel additional feed section with an additional container register for feeding, at least in pairs, another container of the same kind in the manner of the aforementioned first container kind to an additional column stacker of the same configuration.

17. A device for automatically feeding containers of the same kind to a column stacker in a sorter system, the device comprising:
- at least one feed section, on which the containers of the same kind are fed automatically to the column stacker distributed either one by one or in partial stacks;
- a container register joining the feed section for the simultaneous automatic feeding of at least two containers or partial container stacks, which are of equal height and are arranged directly one after another, to the column stacker, wherein a parallel third feed section without insertion of a container register for feeding a container of the same kind corresponding to the maximum stacking capacity of the column stacker to a third column stacker of the same configuration.

* * * * *